Feb. 3, 1959 A. N. BUTLER ET AL 2,871,929
TUBELESS TIRE MOUNTER

Filed May 2, 1955 2 Sheets-Sheet 1

INVENTORS
ARTHUR N. BUTLER &
JAY GRAVES
BY
Gardner & Zimmerman
ATTORNEYS

Feb. 3, 1959  A. N. BUTLER ET AL  2,871,929
TUBELESS TIRE MOUNTER
Filed May 2, 1955  2 Sheets-Sheet 2
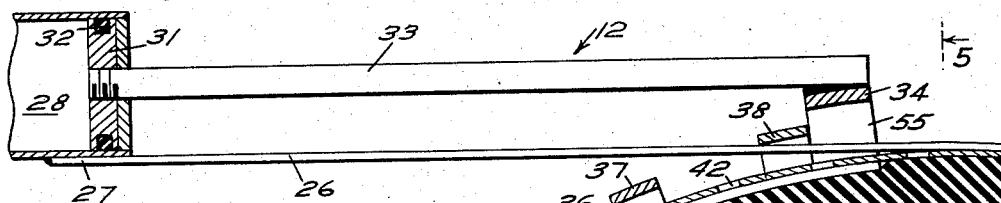
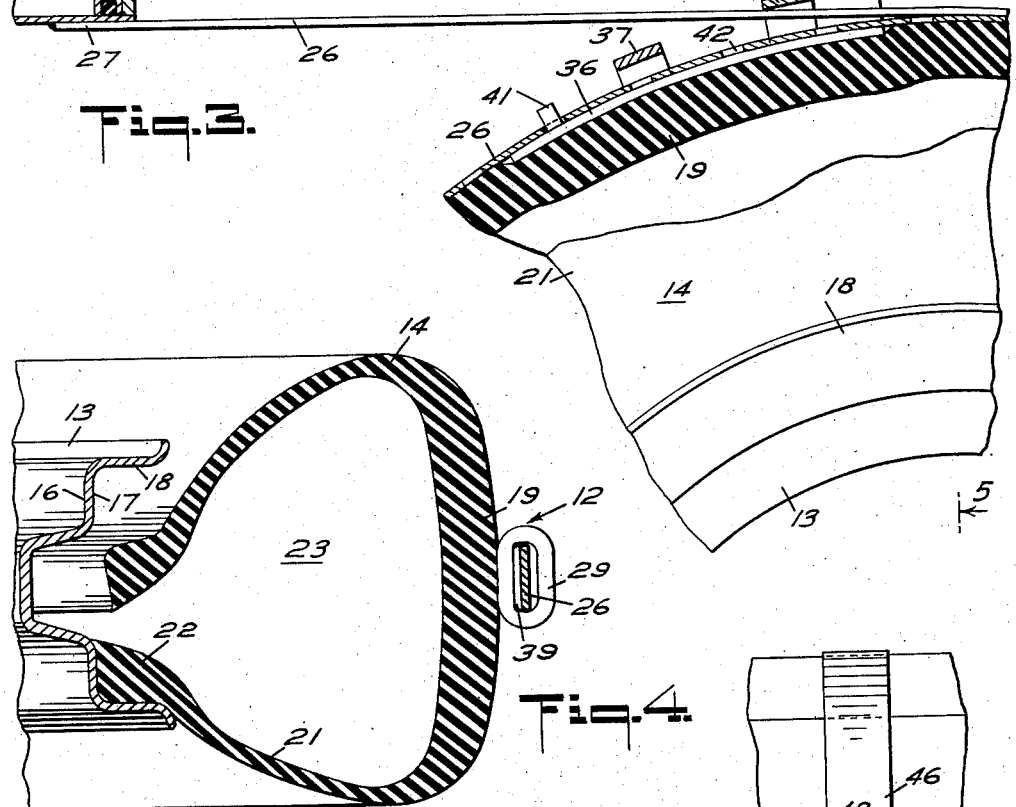
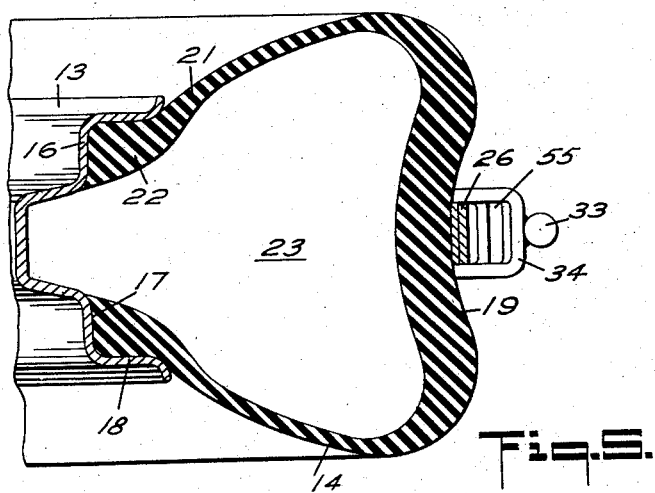
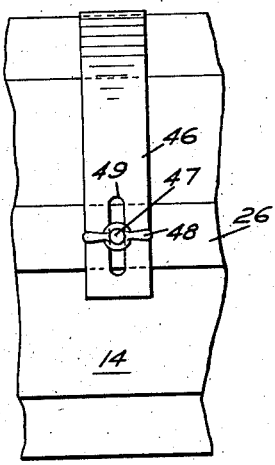
INVENTORS
ARTHUR N. BUTLER &
JAY GRAVES
BY
ATTORNEYS

United States Patent Office 2,871,929
Patented Feb. 3, 1959

2,871,929

TUBELESS TIRE MOUNTER

Arthur N. Butler, Oakland, and Jay Graves, Berkeley, Calif.; said Butler assignor to said Graves Application May 2, 1955, Serial No. 505,346

2 Claims. (Cl. 157—1.21)

This invention relates to apparatus for mounting tubeless tires on the wheels of a vehicle.

In the past several years, the use of tubeless tires has been greatly increased, and modern cars are now frequently equipped with the same as conventional equipment. However, the use of such tires, in which the tire bead portions engage a portion of the rim of the wheel to effect the air seal, presents new problems heretofore not found in the case of conventional pneumatic tires equipped with inner tubes. One of the difficulties encountered in the changing of a tubeless tire is that after the tire is installed on the wheel, the beads are not in contact with the appropriate wheel portions. Hence, upon air being introduced into the tire through the requisite valve, such air, instead of filling the tire and forcing the tire beads into air sealing engagement with the wheel, will merely escape between the marginal portions of the bead and the wheel rim.

It is accordingly an object of the present invention to provide a tire mounter for tubeless tires in which means are provided for positioning the beads of the tire adjacent to the wheel rim and in air sealing engagement therewith prior to the introduction of air into the tire.

Another object of the invention is to provide a device of the character described which is readily adaptable for a wide range of tire sizes and which may rapidly be placed into and out of operation on the selected tires with a minimum of difficulty on the part of the operator.

A further object of our invention is to provide a tire mounter as hereinabove defined in which the means for effecting contact between the tire bead and wheel rim avoids any manual effort on the part of the operator.

Yet another object of the invention is to provide a device of the type referred to which is extremely simple in construction and operation, and which is capable of performing its requisite functions over prolonged periods of time without maintenance or other difficulties.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 3 is an enlarged plan view of a portion of the structure shown in Figure 1, but showing the tool in the position after actuation thereof.

Figure 4 is a cross-sectional view taken substantially in the plane indicated by line 4—4 of Figure 1.

Figure 5 is a cross-sectional view taken substantially in the plane indicated by line 5—5 of Figure 3.

Figure 6 is a side elevational view of the tool positioner in operative position.

Figure 1:
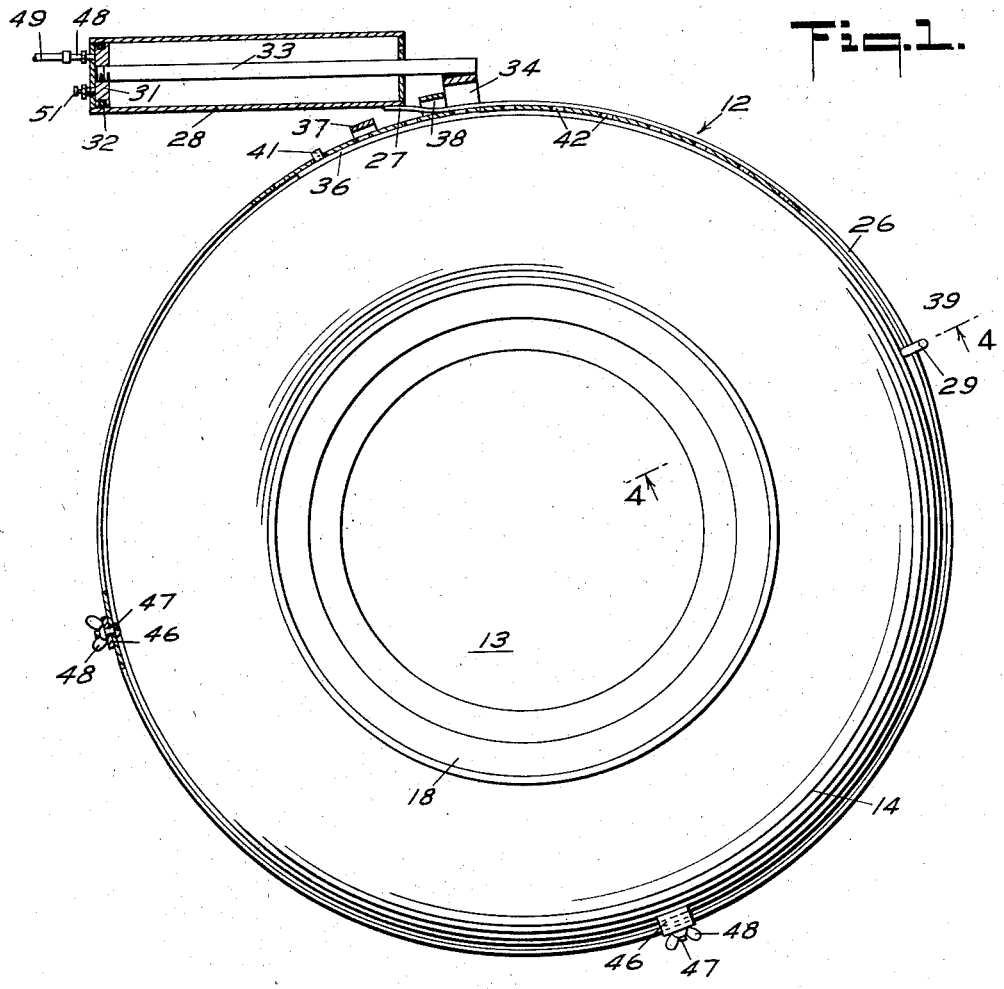
Figure 1 is a top plan view of a wheel and tire, with the apparatus of the persent invention shown in operative position thereon just prior to its actuation.
Figure 2:
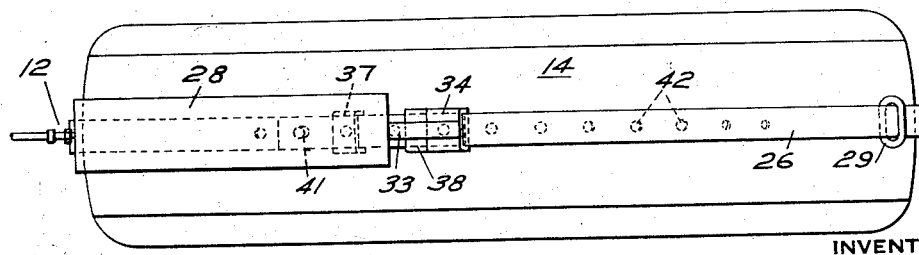
Figure 2 is a side elevational view of the structure shown in Figure 1.

In broad terms, the tool of the present invention includes a resilient band adapted to encircle the tread portion of a tire, with means incorporated therewith for contracting the band so as to depress such tread portion and thereby force the beads of the tire against a wheel rim. In this manner, while the tire is so positioned, air may be introduced into the tire until the air pressure is sufficient to maintain the beads against the rims. At such time, the band may be expanded and removed from the tire and the latter then inflated to its normal operating pressure.

As seen in the drawings, the tool, generally indicated by the numeral 12, is shown in operative position on a wheel 13 having a tubeless tire 14 thereon. The wheel and tire form no independent part of the present invention and the same are illustrated as typical examples of conventional wheels and tubeless tires. As will be seen, the wheel is provided with a rim 16 having an outer circumferentially extending seating portion 17 terminating in opposed side walls 18. The tire 14 includes a central tread portion 19, side walls 21, and enlarged beads 22 at the ends thereof. The beads 22, when the tire is inflated with air, are intended to seat on the rim portions 17 and 18. However, in a deflated condition, the beads will assume the position illustrated in Figure 4 with one or both of the beads spaced from the wheel rim. Thus, any attempt to introduce air into the cavity 23 defined by the tire would result in air escaping between the bead 22 and the wheel rim.

In accordance with the teachings of the present invention, the tool 12 is designed to force the tread inwardly as illustrated in Figure 5, thereby urging each of the beads 22 into firm seating engagement with the appropriate wheel rim portions. In this manner, air may be readily introduced into the tire and such air will maintain the beads in their proper operative relationship.

The tool 12 for accomplishing the foregoing purpose includes a continuous metal band 26 made of clock spring steel or the like and having a width of approximately one inch. The band, in operative use, assumes a generally circular shape and is adapted to encompass the tread portion of a tire to be mounted as will be clear from a reference to Figures 4 and 5 of the drawings. One end 27 of the band is welded or otherwise secured to a cylinder 28 (whose function will be hereinafter described), and the other end of the band is provided with a loop fastener 29 whereby such end in cooperation with other portions of the band may be fed in convolute form for expansion and retraction of its effective diameter.

The cylinder 28 is provided with a piston 31 having suitable O-ring or other seals 32 therein to prevent leakage between the outer peripheral surface of the piston and the inner wall of the cylinder. A piston rod 33 is secured to the piston for movement therewith and at the distal end of the piston, which extends axially outwardly of the cylinder, there is provided a downwardly directed U-shaped bracket 34. At the lower portion of the bracket 34 we provide an arcuate plate 36 extending towards the cylinder and defining with the bracket a completely enclosed slot 55. One or more additional U-shaped brackets 37 and 38 extend upwardly from the plate 36 so that a generally enclosed passage is defined between the plates and the respective brackets for receiving the band 26. The actual position of the parts is such that the band 26, after leaving its end connection to the cylinder 28 passes through at least the bracket 38 and 34, is thence formed in a general circle, and is threaded back between the bracket 37 and subjacent the portion of the band already disposed in the brackets 38 and 34. With this construction, it should be apparent that the end 39 of the band to which the hook or loop 29 is secured, may readily be moved along other portions of the band so as to increase or decrease the effective diameter of the band portions.

The plate 36 is provided with an upstanding stud 41 which is adapted to be seated in any selected one of a number of apertures 42 provided on the band portion adjacent the end 39 thereof. By positioning one of the apertures on the lug 41 and thereby locking the same to the plate 36, upon extension of the piston rod 33, which is likewise secured to the plate through the bracket 34, the band will be contracted. Conversely, upon retraction of the piston relative to the cylinder an expansion of the band will be effected. This, of course, results from the integral connection of one end of the band to the cylinder.

From the foregoing, the mode of operation of the tool of the present invention should be easily understood. The band 26 is placed around the tire and substantially centered on the tread thereof. To assist in this operation, a pair of band positioners 46 may be employed, such positioners being adapted to engage a portion of the side wall of the tire and are secured to the band by means of a screw 47 and wing nut 48. In view of the fact that the spacing between the center of the tire tread and the side wall will vary with different size tires, the positioner is provided with a longitudinal slot 49 to permit proper adjustment of the positioner relative to the band 26. In this manner, with the tire lying on the ground and the positioners in place, the band will be supported at the central tread position. During this stage of the operation, the piston is disposed in the cylinder in the position illustrated in Figure 1 of the drawing; that is, its rearward or retracted position. Air may then be introduced into the cylinder through a fitting 48 connected to a suitable conduit 49 leading to a source of compressed air (not shown). This air or other fluid will force the piston into the expanded position illustrated in Figure 3 and likewise cause the band to tighten up on the tire tread to dish the same inwardly as illustrated in Figure 5 and thereby effect an engagement of both of the tire beads. The tire may then be partially inflated with air in the conventional manner so as to hold the beads in position and at this time an air relief valve 51 may be opened so as to permit manual movement of the piston to its original rearmost position. This will result in diametrical expansion of the band and permit ready removal of the same from the tire.

It will naturally be appreciated that the diameters of various tires vary considerably and hence the apertures 42 are selected so as to permit the use of the tool for a maximum number of different tire sizes. In initially selecting such an aperture, the stud or pin 41 will be placed in an aperture resulting in a fairly good fit between the band and the tire tread.

From the foregoing description it will be understood that while the tool of the present invention is extremely simple in construction and operation, it will adequately perform its function of assisting in the mounting of tubeless tires with a minimum of time and effort on the part of the operator.

What is claimed is:

1. A tool of the character described comprising an arcuate plate, a resilient band of material overlying said plate and having at least a portion of said band in convolute overlapping form immediately adjacent said plate, loop means on said portion for restricting outward relative movement of said band, means on said plate for releasably engaging longitudinally spaced selected portions of said band, one end of the outermost convolute of said band extending generally tangentially to the other portions thereof, a cylinder secured to said band end, a piston in said cylinder having a piston rod extending therefrom, said piston rod being operatively secured to said plate for movement therewith whereby actuation of said piston results in selective expansion and contraction of said band.

2. Apparatus of the character described comprising: a cylinder, a piston in said cylinder, a rod secured to said piston and extending outwardly from said cylinder, an arcuate plate carried at the distal end of said piston rod extending towards said cylinder and having a plurality of apertures therein disposed in spaced relation along the arc of a circle for slidably receiving a metal band, a resilient metal band in convolute form having the outermost end secured to said cylinder and extending through at least one of said apertures, said band continuing in generally circular form and passing radially inwardly of said secured end through another of said apertures so as to form a double band thickness at certain portions thereof, means including a projection on said plate and a plurality of longitudinally spaced apertures in said inner band portion for securing said inner band portion to said plate at selected positions therealong, and means for moving said piston and piston rod in said cylinder whereby said band may be selectively opened and retracted upon relative movement of the plate and cylinder.

References Cited in the file of this patent

UNITED STATES PATENTS

| | | |
|---|---|---|
| 720,816 | Karl | Feb. 17, 1903 |
| 1,104,579 | Thorsby | July 21, 1914 |
| 1,625,258 | Jelbert | Apr. 19, 1927 |
| 1,966,580 | Bull | July 17, 1934 |
| 1,986,748 | Pritchard | Jan. 1, 1935 |
| 2,106,118 | Jackson et al. | Jan. 18, 1938 |
| 2,684,112 | Coats | July 20, 1954 |